(12) United States Patent
Asano et al.

(10) Patent No.: US 6,456,451 B1
(45) Date of Patent: Sep. 24, 2002

(54) METHOD AND APPARATUS FOR DISK DRIVE SEEK CONTROL

(75) Inventors: Hideo Asano, Machida (JP); Kenji Okada, Yokohama (JP); Tetsuo Ueda, Sagamihara (JP); Koichi Arai, Fujisawa (JP); Hideki Ohzeki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/220,419

(22) Filed: Dec. 24, 1998

(30) Foreign Application Priority Data

Dec. 25, 1997 (JP) .............................................. 9-357807

(51) Int. Cl.$^7$ ............................................. G11B 5/596
(52) U.S. Cl. ................... 360/77.04; 360/75; 360/77.08; 360/78.04
(58) Field of Search ................................ 360/77.04, 75, 360/77.08, 78.04

(56) References Cited

U.S. PATENT DOCUMENTS 5,682,274 A * 10/1997 Brown et al. ............ 360/77.04
5,956,200 A * 9/1999 Kohno et al. ............ 360/77.04
6,067,205 A * 5/2000 Mathews et al. ......... 360/77.04
6,091,566 A * 7/2000 Matsui et al. ............ 360/77.04

FOREIGN PATENT DOCUMENTS

| JP | 5-94608 | 4/1993 |
| JP | 7-93733 | 7/1995 |
| JP | 8-221918 | 8/1996 |
| JP | 8-235548 | 9/1996 |
| JP | 9-120650 | 6/1997 |
| JP | 9-147337 | 6/1997 |

* cited by examiner

Primary Examiner—David Hudspeth
Assistant Examiner—Mitchell Slavitt
(74) Attorney, Agent, or Firm—Abdy Raissinia; Bracewell & Patterson, L.L.P.

(57) ABSTRACT

A disk drive seek control system device to reduce track pitch. When data is recorded, an offset value is added to the position of a read head element along the width of a track corresponding to an offset $\Delta w$ between the read head element and a write head element. The value of the offset depends on the yaw angle $\theta$ of the head. When data is read, the position of the read head element is chosen to be either the position of the write head element during write operations, or the midpoint between the position of the write head element and the read head element during write operations, or the center of a track.

10 Claims, 12 Drawing Sheets

YAW ANGLE OF A READ/WRITE HEAD

METHOD AND APPARATUS FOR DISK DRIVE SEEK CONTROL

BACKGROUND OF THE INVENTION

1. Field of the Invention

The present invention relates to a disk drive seek control system, and more particularly to a disk drive seek control system to reduce track pitch.

2. Description of Related Art

Developments in manufacturing and control technology have significantly increased the recording density of disk drives. The high recording density makes the magnetized region per unit signal recording narrower and narrower. Conventional methods of reading signals using the relative movement between a conventional magnetic head and a magnetized region on a recording disk have almost reached their technical limit. Accordingly, a method of reading signals using a MR (Magneto-resisitive) head which utilizes the magneto-resistive effect but does not directly use the relative movement between a head and a disk is now in use.

Since this MR head is a read only head, disk drive read/write heads include a separate conventional magnetic head for writing. FIG. 2 shows a plane view illustrating the structure of such a read/write head using a MR element. In such a read/write head x1, there is an offset between a read head element (a MR head) x2 and a write head element (a conventional magnetic head) x3 due to its structural characteristics.

In a Winchester type hard disk drive, a rotary actuator is generally used for positioning a read/write head in a transversal direction of the tracks. As shown in FIG. 3, the center line of the read/write head x1 has a yaw angle (θ1, θ2) with respect to the track center line. This yaw angle varies with the rotational angle ρ (a skew angle) of the rotary actuator.

The read/write head x1 composed of the read head element x2 and the write head element x3 with an offset as shown FIG. 2 is mounted on the rotary actuator so that the centers of the read and write head elements x2 and x3 are in line with the rotational center C of the rotary actuator as shown in FIG. 3. Accordingly, as shown in FIG. 4, the position difference Δw (Δw=L sin θ) is generated between the read and write head elements x2 and x3 in the radial direction of a track depending upon the yaw angle θ of the read/write head. This position difference Δw does not cause a big problem and is negligible when this difference is relatively small compared to the track width. However, as track widths have become smaller, the position difference Δw has become increasingly large and is no longer negligible. When GMR (Giant Magneto-resistive) heads of spin valve type are used instead of a MR head, the offset (L) is even larger than that of the MR head. Therefore, the position difference is also larger.

In order to increase the accuracy of the positioning of the head x1, for instance, the read head element x2 reads the servo signal recorded with a predetermined angle space on a track to detect the exact position of the head x1 and then controls the positioning of the head x1 based on the detected position. However, even if the position of the head x1 is so accurately controlled, it is very difficult to reduce track pitch further because of the variance of the recording position of the write head element x3 caused by the offset Δw corresponding to the yaw angle.

Accordingly, it is an object of the present invention to provide a disk drive apparatus and a seek control device thereof which further reduce track pitch so as to increase recording density.

SUMMARY OF THE INVENTION

The present invention provides a disk drive seek control system to reduce track pitch. A disk drive apparatus according to the present invention includes a disk-shaped recording medium with a plurality of concentric tracks thereon. Each track has a servo pattern recorded on it for the purpose of tracking control. A head actuator module in the disk drive has a read head element and a write head element. The head actuator module moves the read head element and the write head element in a transverse direction across the tracks. The head actuator module separately positions the read head element and the write head element in the radial direction of the tracks, with an offset which varies with a skew angle of the head actuator module. A position detection module in the disk drive detects a position of the read head element from a readout signal of the servo pattern read by the read head element, and outputs a position detection signal. A servo control module controls the head actuator module based upon the position detection signal. An offset detection module detects the offset between the read and write head elements in the radial direction of the track according to the skew angle, and outputs an offset detection signal. The disk drive further includes a write head element position compensation module which based on the offset detection signal, controls the servo control module so as to position the write head element at a predetermined position along the radial direction of a first predetermined track during write operations.

The disk drive apparatus of the present invention further comprises a seek control device for positioning a read/write head at a predetermined track on a disk-shaped recording medium. The disk-shaped recording medium is provided with a plurality of concentric tracks on which a servo pattern is recorded for the purpose of tracking control. The seek control device includes a position detection module, a position control module and a seek completion detection module. The position detection module reads the servo pattern, and for each readout of the servo pattern, outputs position detection signal which has a nonlinear characteristic with respect to the displacement of the head in the track. The position control module moves the read/write head to a target position based upon the position detection signal.

The seek completion detection module determines when the seek operation is complete. When the variance of the position detection signal from the position detection module, corresponding to the displacement of the head at the target position, is relatively small, the seek completion detection module checks the position detection signal to determine whether the position detection signal shows, for a first predetermined number of times, that the head is within a first region from the target position. The seek completion detection module then checks the position detection signal to determine whether it shows for a second predetermined number of times that the head is within a second region from the target position which is closer to the target position than the first region. Next, the seek completion detection module checks whether the variance of the position detection signal is within a first range over a first time period. If the above conditions are all true, then the seek operation is determined to be complete.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
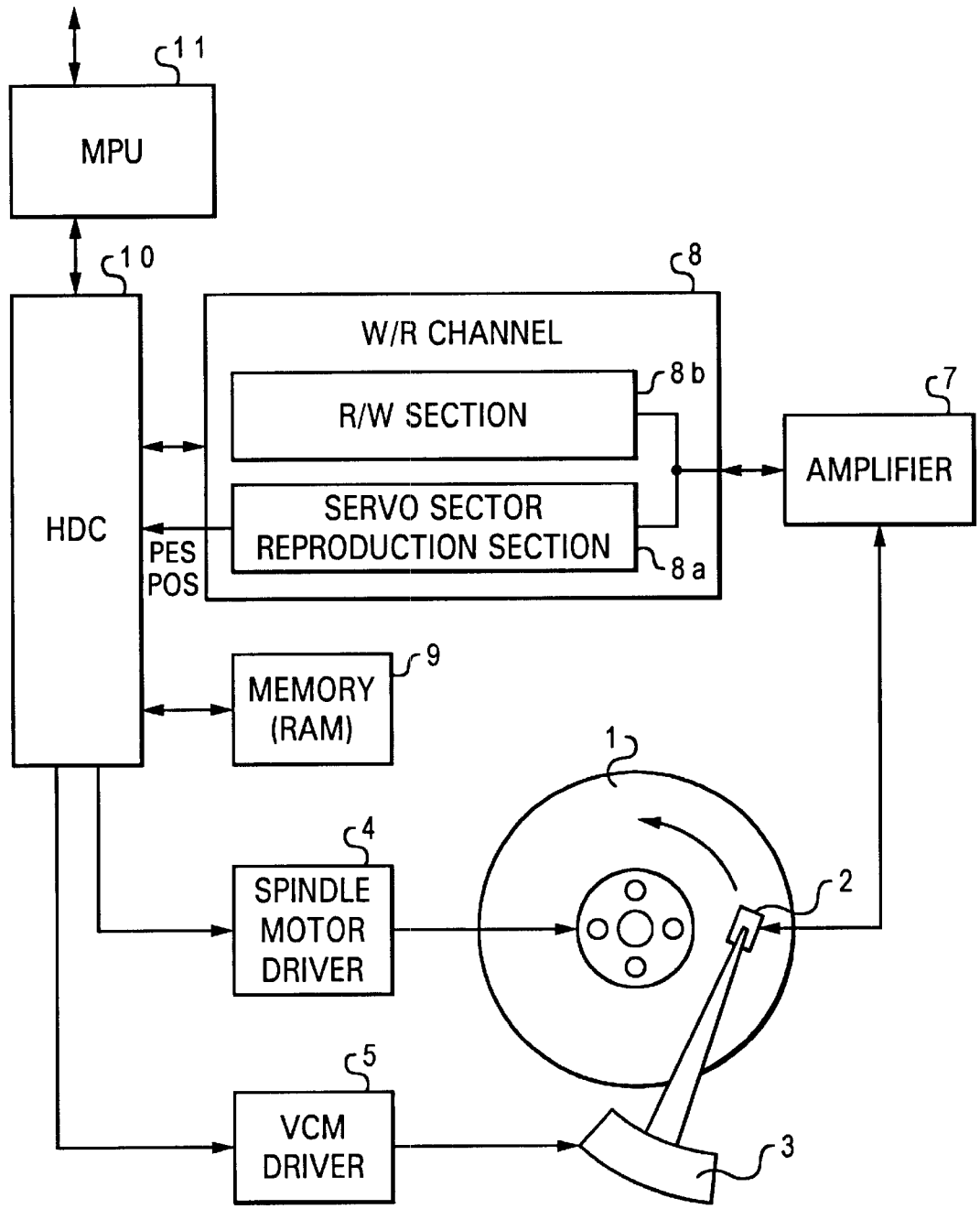
FIG. 1 is a block diagram illustrating a configuration of a disk drive apparatus in accordance with a preferred embodiment of the present invention.
Figure 2:
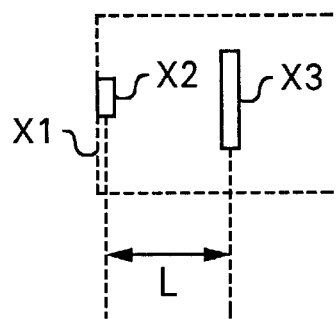
FIG. 2 is a plane view of a configuration of a head employed in the disk drive apparatus.
Figure 3:
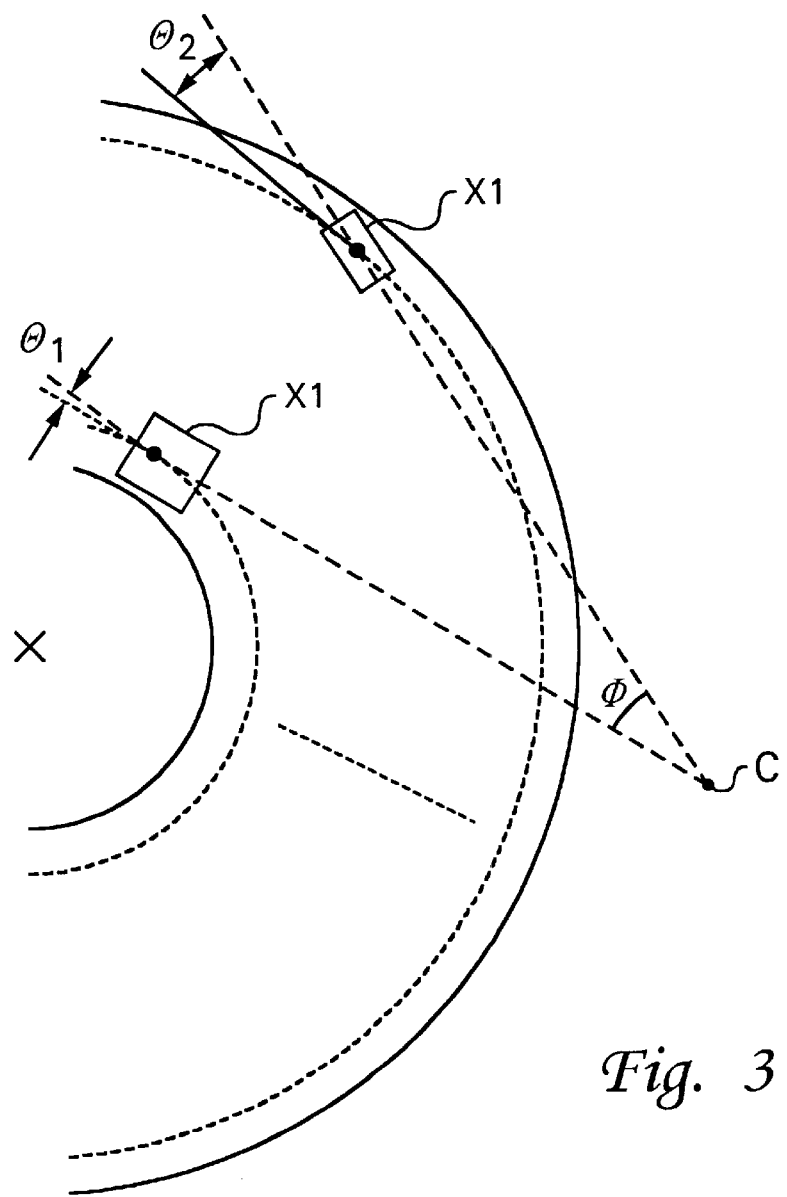
FIG. 3 is a schematic diagram illustrating yaw angle of the head.
Figure 4:
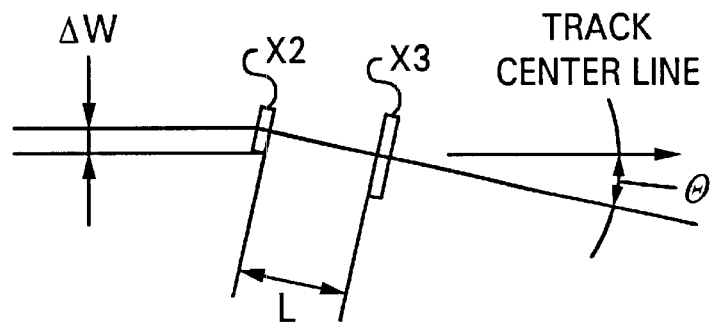
FIG. 4 is a plane view illustrating the variation of the yaw angle of the head.

FIG. 1 shows the configuration of a disk drive apparatus in which a preferred embodiment of the present invention is implemented. This disk drive apparatus is provided with a magnetic disk 1 for recording data, a read/write head 2 for reading and writing data from and to the magnetic disk 1, a rotary actuator 3 for moving the head 2 substantially in a radial direction of the magnetic disk 1, a spindle motor driver 4 for controlling the rotation of the magnetic disk 1, a voltage controlled motor driver (VCM driver) 5 for driving the rotary actuator, an amplifier 7 for amplifying output or recording signal of the head 2, a read/write channel (W/R channel) 8 including a servo sector reproduction section 8a for reproducing a servo sector and a R/W section 8b for reading/writing data, a RAM 9 for storing data, such as, a defective sector table and so on, a hard disk controller (HDC) 10 for controlling the apparatus overall, and a microprocessor unit (MPU) 11 including a processor, a memory, an interface with outside equipment so as to control for example, the input/output of data and commands for outside units.

Figure 5:
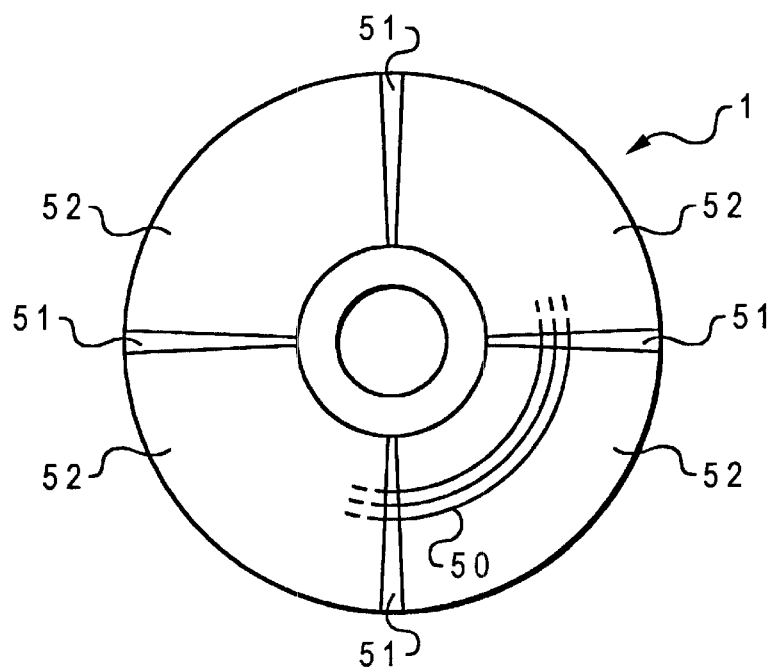
FIG. 5 is a plane view illustrating a format of a magnetic disk employed in the disk drive apparatus in accordance with the preferred embodiment of the present invention.

As shown in FIG. 5, the magnetic disk 1 is provided with a plurality of concentric tracks 50 of a predetermined width on its surfaces. A servo region 51 on which a servo sector is recorded for the purpose of tracking control and a data region 52 on which a data sector is recorded are formed on each track 50. The servo region 51 is formed on the surface of the magnetic disk 1 with a predetermined rotational angle space.

Figure 6:
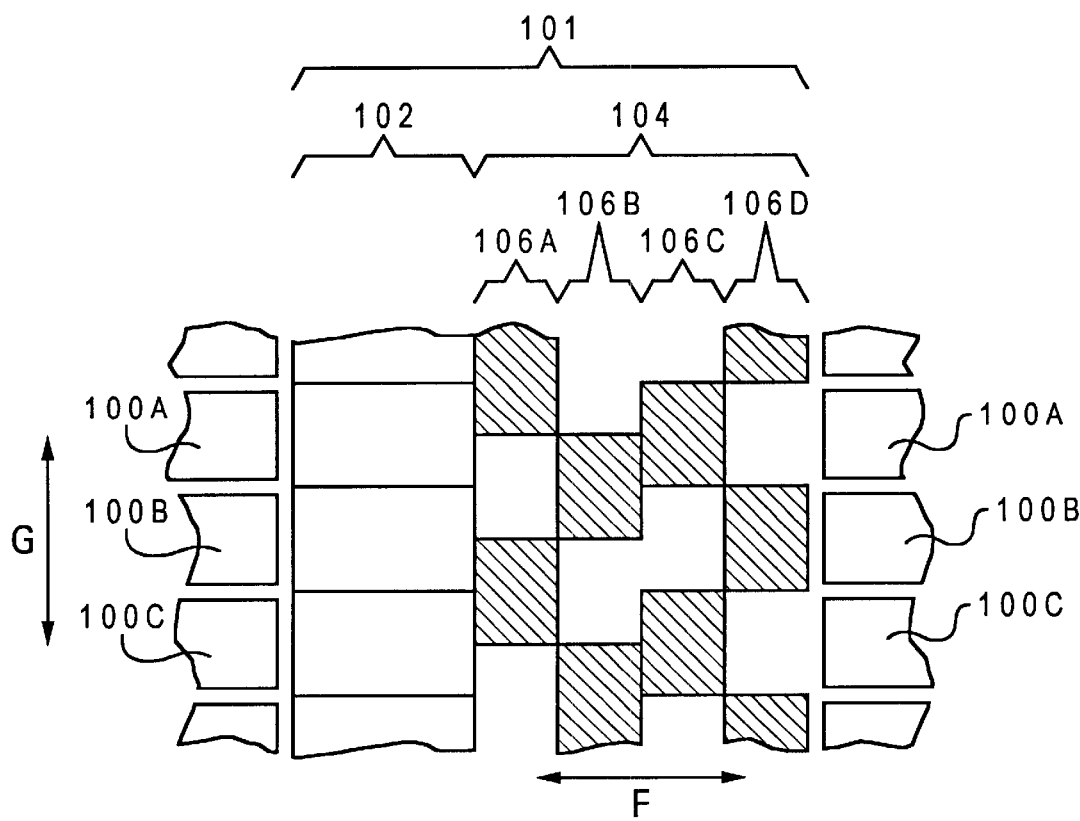
FIG. 6 is a plane view illustrating a format of a servo sector recorded on the magnetic disk.

As shown in FIG. 6, tracks 100A, 100B, and 100C on which data sectors are recorded are formed in the data region 52. A servo sector 101 is formed in the servo region 51. Servo sector 101 includes identification information recording sections 102 and burst pattern recording sections 104.

The data regions 52 are divided into a number of zones in a axial direction. Tracks in each zone have sectors recorded with a number that depends on a position of each zone in a radial direction of the disk.

Each track is allocated a cylinder ID (CYLID) corresponding to its track number (TRK) in advance. In addition, each servo sector 101 is allocated a physical sector number (PHSN). The identification information recording section 102 comprises: a servo region starting code, a gray coded CYLID (cyclic binary code), identification information for a predetermined number of codes representing PHSN, and other identification.

Figure 7:
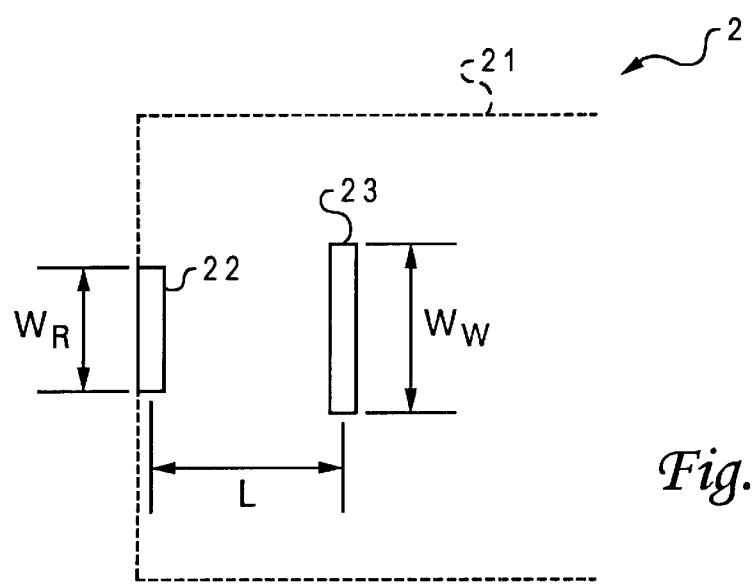
FIG. 7 is a plane view illustrating a configuration of the head employed in the disk drive apparatus.

As shown in FIG. 7, the head 2 has a head slider 21. A read head element 22 and a write head element 23 are provided on the surface of the slider 21 facing the magnetic head 21. The read head element 22 is, for example, a MR head or a GMR head. The width of the read head element 22 is designed to be about one half of a track pitch. The write head element 23 is a conventional magnetic head with a width that is narrower than the track pitch but wider than the width of the read head element.

Figure 8:
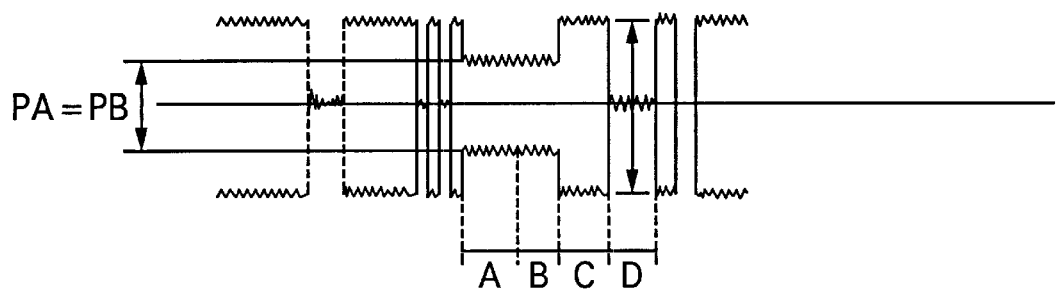
FIG. 8 is a wave form chart illustrating the readout signal of a servo sector when the head passes the center of a track.

FIG. 8 shows a sample wave form of a readout signal read from the servo sector 101 when the head 2 passes the center of the track 100A. Regions A, B, C, and D in FIG. 8 identify the read out signal components from the burst patterns, 106A, 106B, 106C and 106D, respectively. In this example, since the area of the burst pattern 106A passed by the head 2 has the same width as that of the area of the burst pattern 106B passed by the head 2, the peak to valley values PA and PB of the wave forms of readout burst patterns are equal.

Figure 9:
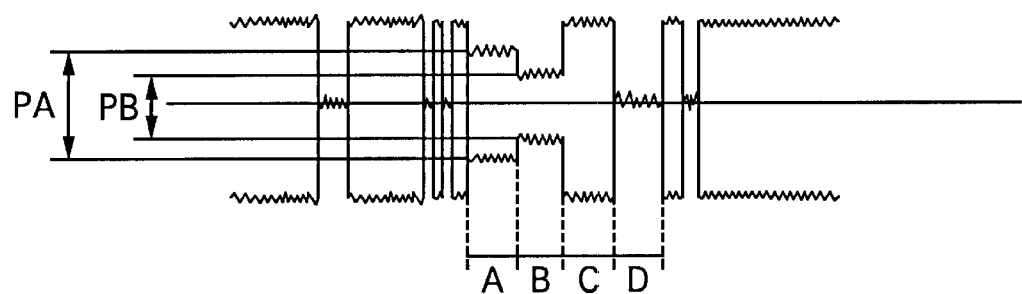
FIG. 9 is a wave form chart illustrating the readout signal of a servo sector when the head passes other than the center of a track.

On the contrary, if head 2 passes a track away from the center of the track, the area of the burst pattern 106A passed by the head has a different width than that of the area of the burst pattern 106B passed by the head. Therefore, as shown in FIG. 9, there is a difference corresponding to the deviation of the head trace from the center of a track between the peak to valley values PA and PB of the wave forms of readout patterns.

The W/R channel 8 generates a position error signal (PES) representing the deviation of head position from the center of a track. The PES is generated using the peak to valley values of the readout signals of the burst patterns 106A and 106B in accordance with the following equation $$PES=PA/(PA+PB) \qquad (1)$$

The W/R channel 8 supplies the PES to the HDC 10.

The PES, for example, is generated by the W/R channel 8 as a digital value which ranges from 0 to 255. When the head 2 passes the center of the track 100A, PA equals PB.

Therefore, PA/(PA+PB) is 0.5. The W/R channel generates, for example, the PES representing 128. When the head 2 deviates downward from the center of the track 100A in FIG. 6 and passes the burst pattern 106B only, and none of the burst pattern 106A, PA is 0. Therefore, PA/(PA+PB) is 0 and the W/R channel 8 generates the PES representing 0. When the head 2 deviates upward from the center of the track 100A in FIG. 6 and passes the burst pattern 106A only, and none of the burst pattern 106B, PB is 0. Therefore, PA/(PA+PB) is 1 and the W/R channel 8 generates the PES representing 255.

The wave forms of the readout signal from the burst patterns 106C and 106D instead of the burst patterns 106A and 106B are used to calculate the PES if the PES generated by equation (1) is too small (for example, smaller than 64) or too large (for example, larger than 192), since the accuracy of the PES is reduced by the misregistration of the recorded burst patterns.

In addition to generating the PES and supplying the PES to the HDC 10, the W/R channel 8 detects the track number (TRK) from the readout signal using the identification information recording section on the servo sector 101. W/R channel 8 adds the PES to this TRK, and supplies to HDC 10 the resultant value which represents the head position (POS).

When the HDC 10 is instructed to read or write data by a command supplied through the MPU 11 by an external device, the HDC 10 has the head seek for a target track designated by address information in the command. When detecting that the head 2 arrives at the target track based on the POS supplied from the W/R channel 8, the HDC 10 determines that the seek operation is completed. HDC 10 then controls track following so that the head 2 follows the target track. During the track following, the read head element 22 is controlled to maintain a position at the center of the track which corresponds to a PES value of 128. At the time when the head 2 arrives at the position of the sector designated by the address information in the command by the rotation of the magnetic disk 1, the data is read or written from or to the disk.

Figure 10:
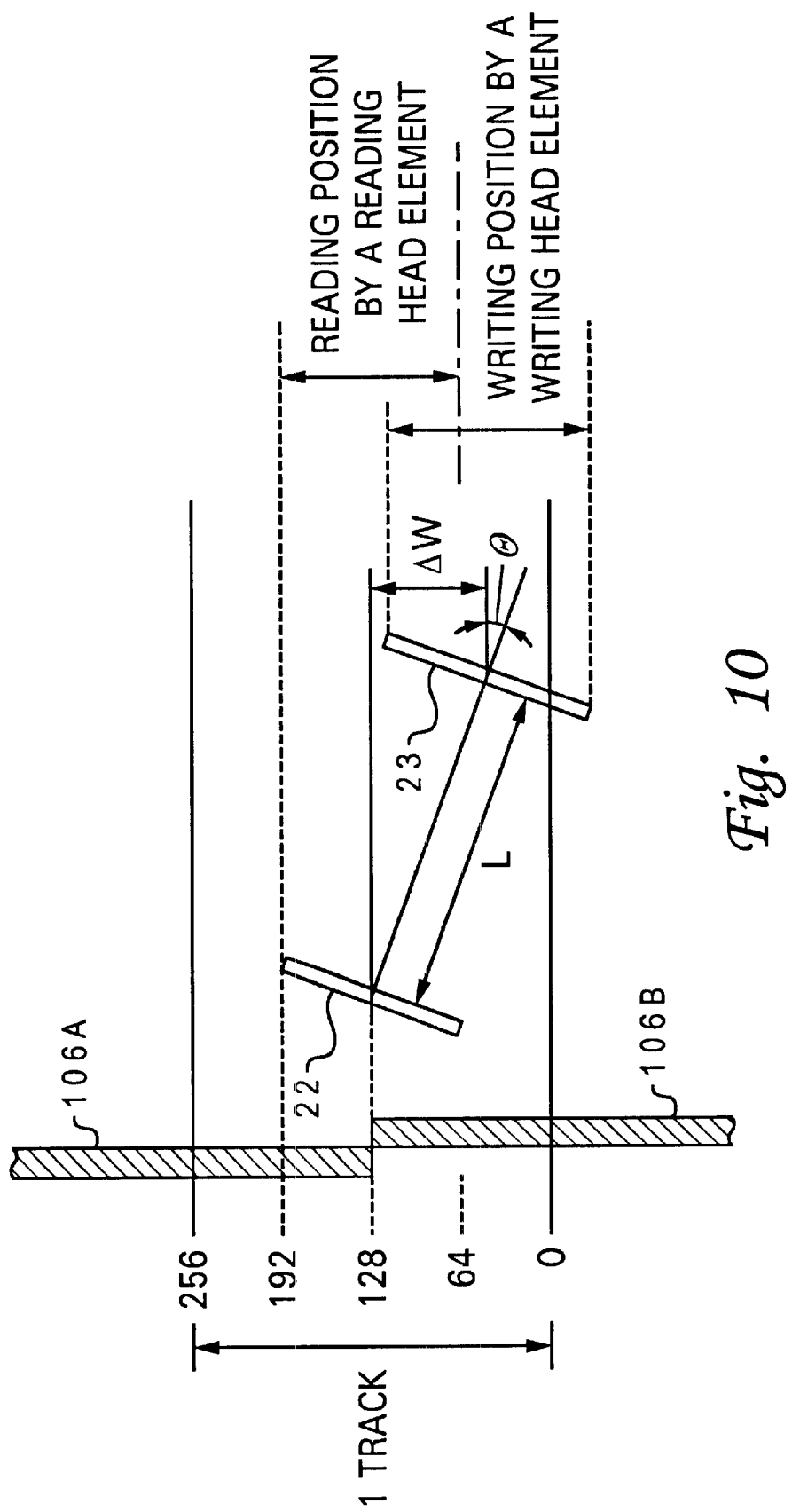
FIG. 10 is a plane view illustrating an offset between a read head element and a write head element.

When the rotary actuator 3 is employed to move the head 2, a yaw angle is generated between the head 2 and a track by a rotational angle (a skew angle) of the rotary actuator 3. Therefore, if the read head element 22 and the write head element 23 are spaced as shown in FIG. 7, position difference Δw (Δw =L sin θ) between the read head element 22 and the write head element 23 is generated in the radial (width) direction of a track depending on the yaw angle of the head as shown in FIG. 10. For simplified explanation, FIG. 10 shows the burst patterns 106A and 106B only. Although this difference Δw is negligible when it is relatively small with respect to a track pitch, the difference Δw causes a problem when it is relatively large with respect to a track pitch due to the increase of the track density or due to a relatively large L of a head, such as, a GMR head of spin valve type. For instance, as shown in FIG. 10, if the position of the head 2 is controlled so that the PES is 128, the read head element 22 is positioned at the center of the track but the write head element 23 is positioned away from the center of track.

Data written using the head-track alignment shown in FIG. 10, is written far away from the center of a track. Writing data far away from the center of the track increases the risk that data will be written into neighboring tracks. Furthermore, when reading out data recorded off center, the trajectory of the read head element 22 deviates from the write position of the write head element 23 and the level of the readout signal is decreased. This increases the error rate of the readout signal.

Figure 11:
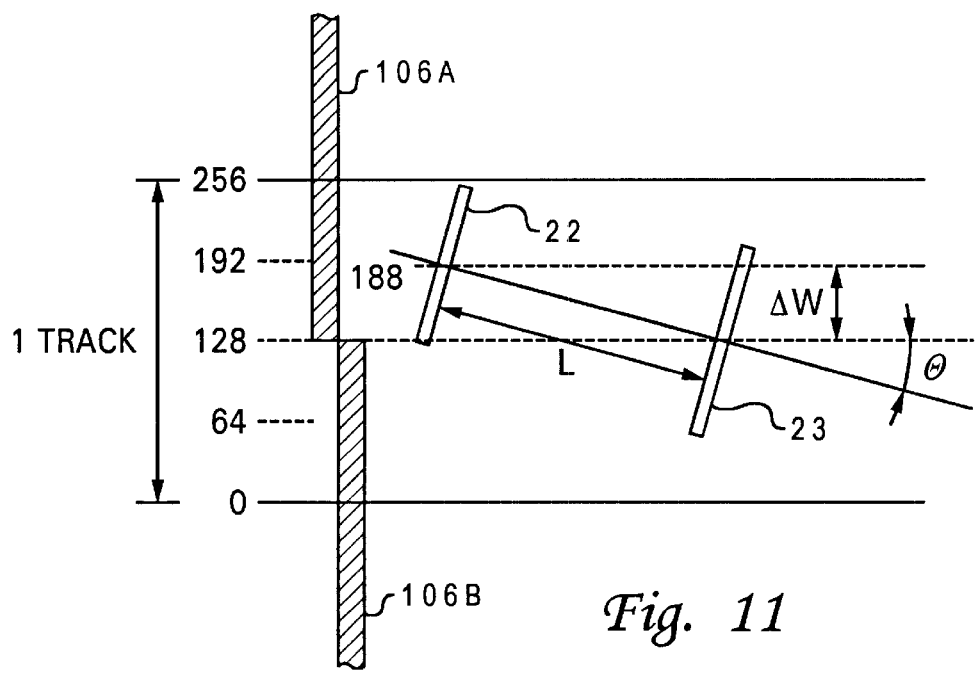
FIG. 11 is a plane view illustrating an example of the offset during write operations.

Therefore, as shown in FIG. 11, in the disk drive apparatus of the present invention during write operations, the positioning of the head 2 is controlled by adding the same offset (60 in the case of FIG. 11) between the read head element 22 and the write head element 23 to the standard position for track following control so that the write head element 2 is positioned at the center of a track. In this example shown in FIG. 11, an offset (60) is added to the PES (128) which is usually the standard for track flowing control to make a position represented by the PES (188) as a standard position. The center of the read head element 22 is controlled to be positioned at the PES (188) which is lower by 4 than a position (PES of 192) for track following control.

Although this offset can be calculated from the width of the write head 23, the above position difference Δw which depends upon the yaw angle θ, track pitch, and so on; the offset may also be determined at the manufacturing stage by performing read/write operations with changing offset values and evaluating the wave forms of the readout signals or error rates.

In the example of FIG. 11, the read head element 22 is positioned at approximately the standard position 188 while the write head 23 is positioned at the center of a track. As a result, the accuracy of the PES is not so deteriorated. However, if the yaw angle θ of the head gets larger than that shown by FIG. 11, an offset needs to be increased. If the PES is over about 192, the accuracy of the PES calculated by the above equation (1) at a standard position could be deteriorated. The decrease in the accuracy of the PES would cause a decrease in the accuracy of the track following control during writing. This in turn would cause a decrease in the accuracy of the track position to be written and an increase in the readout signal error rate.

In this case, the accuracy of track following control would be increased by generating the PES from the readout signal of the burst patterns 106C and 106D and then by using this generated PES for track following control. However, it would increase calculation load.

Figure 12:
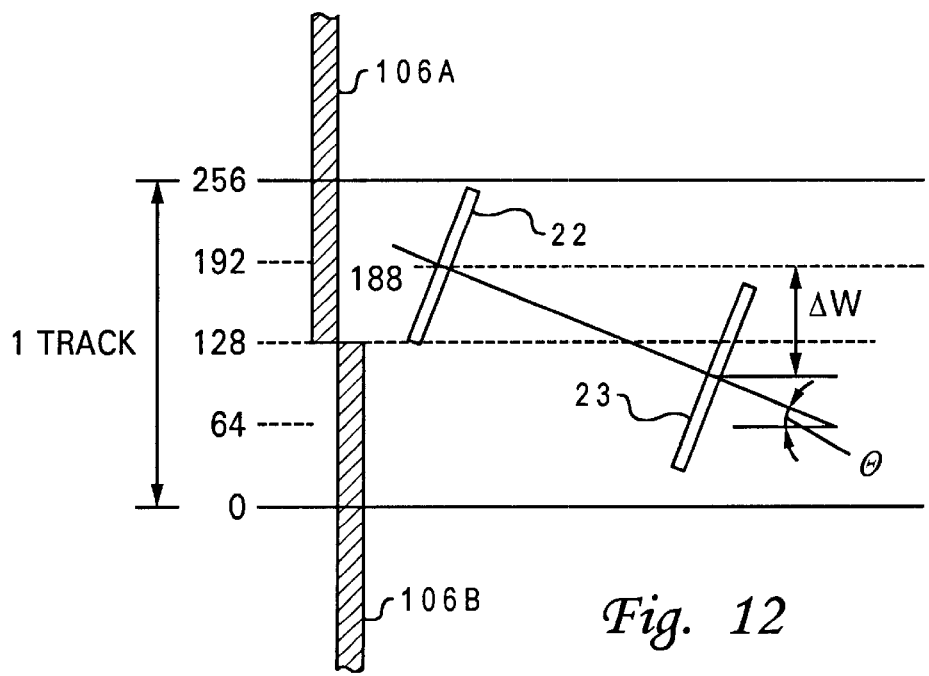
FIG. 12 is a plane view illustrating another example of the offset during write operations.

To solve this problem, an offset may be set at a second write offset value which does not make the PES value too large when the yaw angle θ of head 2 is large. For example, as shown in FIG. 12, although the yaw angle θ is larger than that of FIG. 11, the offset value is chosen to be around 60 so that a standard position is chosen to be the position where the accuracy of the PES is relatively good (the PES shown is 188 which is lower by 4 than 192). The offset value of this example is chosen by measuring the linear characteristic or the like of the PES with respect to the actual head position variance and evaluating the results.

As described above, by choosing an offset value to be a value so that a standard position is located in a region where the accuracy of the PES is relatively good, the accuracy of track following control for write operations can be improved, the accuracy of track position to be recorded can be improved, and the readout signal error rate can be decreased.

Either of the above two offsets (the first and the second write offsets) may be used. Which of the two offsets is best may depend on the hard disk drive specifications or on a radial position of the magnetic disk.

Using either of the above offsets improves the accuracy of the control of positioning of the write head 23 during write operations, enables track pitch to be narrower, and increases recording density.

In order to read a track recorded using the above procedure, track following control is performed offsetting the head so that the read head element 22 is positioned at the record position on the track. The position of the read head element 22 during read operations may be made to exactly match the position of the write head element 23 during write operations. However, since the width of the write head element 23 is wider than that of the read head element 22, the read head element can still read data which deviates from the center of a recorded track. It is not necessary for the read head element 22 during read operations to be exactly positioned at the position of the write head element 23 during write operations in order to read out data.

There are several alternative procedures to determine an offset value during read operations as described below. In the first procedure, an offset value is determined so that the position of the read head element 22 during read operations exactly matches the position of the write head element 23 during write operations. This is referred to as the first read offset value.

Figure 13:
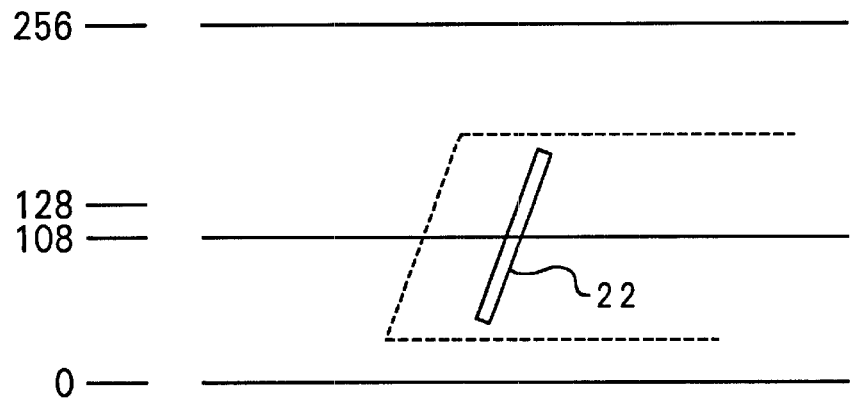
FIG. 13 is a plane view illustrating an example of the offset during read operations.

In the first procedure, the read offset value (an offset of the center position of the read head element 22) is calculated by subtracting the actual offset between the read head element 22 and the write head element 23 from the offset value of the center of the read head element 22 during write operations. For example, as shown in FIG. 12, if the actual offset between the read head element 22 and the write head element 23 is about 80 and the offset value of the center of the read head element 23 during write operations is 60, the read offset value is –20 as shown in FIG. 13. Therefore, the center position of the read head element 22 is PES 108 as shown in FIG. 13.

In the first procedure, the position of the read head element 22 during read operations matches the position of the write head element 23 during write operations which provides an optimum readout signal from the recorded data. The accuracy of the PES may decrease somewhat depending on the offset value during write operations and the calculation method for the PES during read operations.

Figure 14:
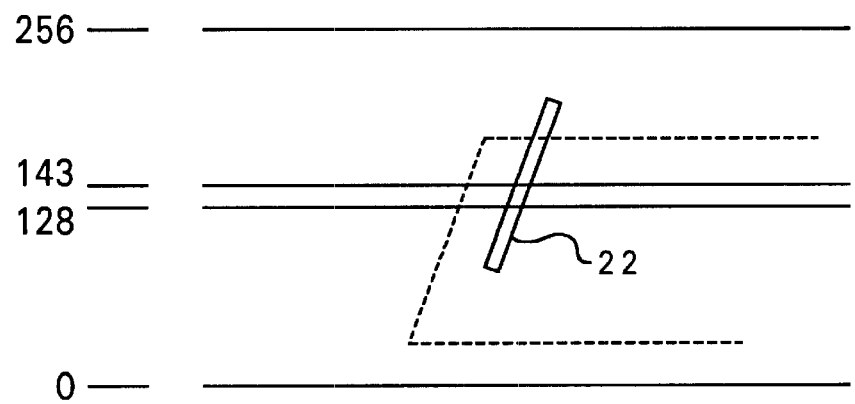
FIG. 14 is a plane view illustrating another example of the offset during read operations.
Figure 15:
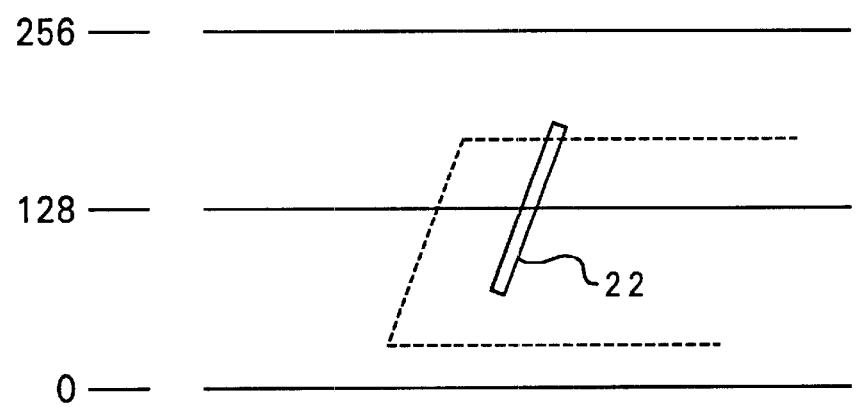
FIG. 15 is a plane view illustrating another example of the offset during read operations.

In a second procedure for determining offset value, the offset value is determined so that the position of the read head element 22 is the center of the positions of the write head element 23 and the read head element 22 during write operations. This is referred to as the second read offset value. In this second procedure, the second read offset value is calculated by subtracting the actual offset between the read head element 22 and the write head element 23 from the offset value of the center of the read head element 22 during write operations and then multiplying this difference by a predetermined value. For example, as shown in FIG. 12, the actual offset between the read head element 22 and the write head element 23 is 80 and the offset value of the center of the read head element 22 during write operations is 60. Then, the difference is –20. The difference –20 is multiplied by a predetermined value, for instance, 0.75, to generate the offset value 15. As shown in FIG. 14, the center of the read head element 22 is positioned at the PES (143).

The second offset value provides high speed operation and optimizes the stability of head positioning control since the head movement can be reduced when repeating read and write operations.

In a third procedure for determining an offset value, the offset value is determined so that the read head element 22 is positioned at the center of a track. This is referred to as the third read offset value. In this third procedure, the third read offset value of the center position of the read head element 22 during read operations is chosen to be 0 so that the center position of the read head element 22 is positioned at the center of a track. As mentioned above, since data can still be read even if the position of the read head element 22 during read operations deviates from the position of the write head element 23 during write operations, the read offset value can be 0 when the offset value during write operations is not so large. The third read offset value optimizes the accuracy of the PES.

The offset value that is used may be determined based upon specifications of the hard disk drive, an offset value during write operations, or a position in a radial direction of the magnetic disk 1.

Although calculation for each of the above offset values may be performed at a position corresponding to a target track for reading or writing, the above offset values may be previously calculated and stored in a table with corresponding target track positions in a memory. An offset value may then be read from the table in response to the position of a target track. Using a table decreases the calculation loads of the HDC 10, the MPU 11 and so on.

Since the data regions 52 are divided into a number of zones in a radial direction of the magnetic disk 1 (that is, corresponding to a rotational angle of the rotary actuator 3), if the track pitch has room and the offset value for the position of the head 2 does not need to be strictly chosen, then offset values may be fixed at each zone and stored in a table with corresponding zones. The offset value may be read from the table for a corresponding zone to which a track to be read from or written to belongs. This table reduces the calculation load, facilitates high speed operation, and improves the response of track following control.

Figure 16:
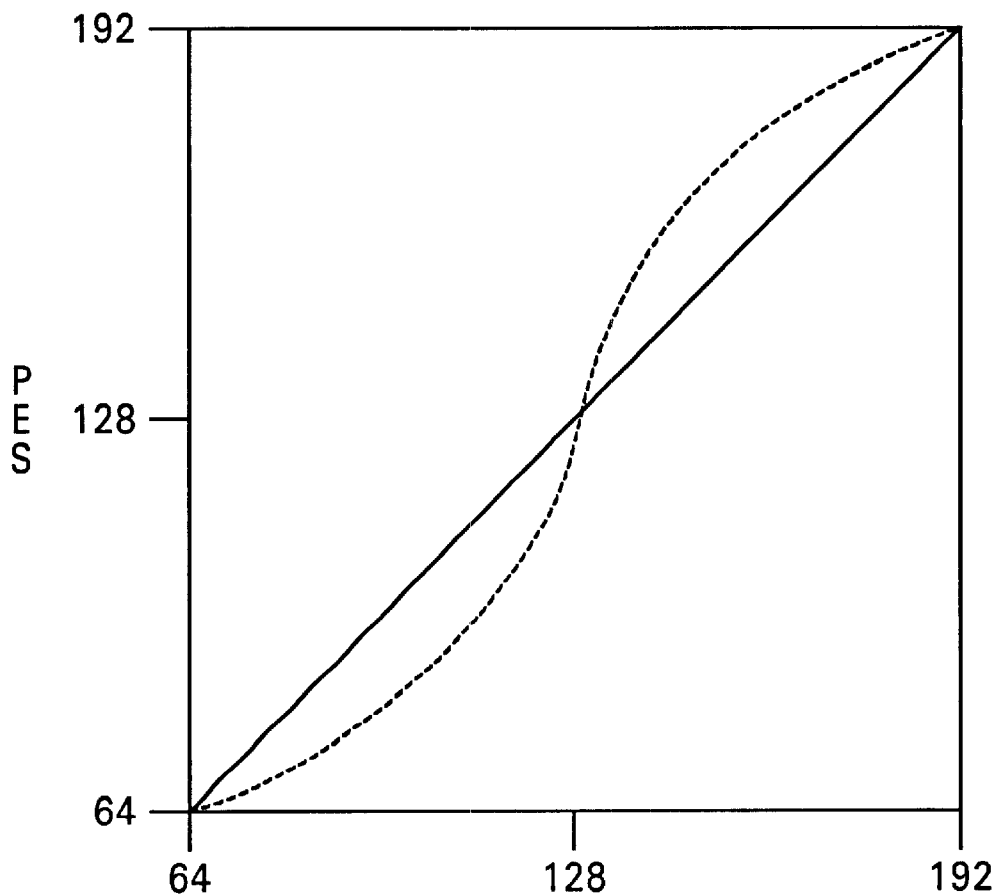
FIG. 16 is a diagram illustrating a relationship between the actual displacement of the read head element (the horizontal axis) and detected PES (the vertical axis)

The PES calculated from the above equation (1) varies with the actual position of the read head element 22 as shown in FIG. 16 (PES error is exaggerated for illustration) because peak to valley values PA and PB of the wave forms of readout signals of the burst patterns 106A and 106B have components varying quadratically with distances between the read head element 22 and the burst patterns 106A or 106B. Therefore, in the range of the displacement of the read head element 22 from 96 to 160, the variance of the PES is larger than the actual displacement of the read head element 22. On the contrary, in the ranges of the displacement of the read head element 22 from 46 to 96 and from 160 to 192, the variance of the PES is smaller than the actual displacement of the read head element 22.

Figure 17:
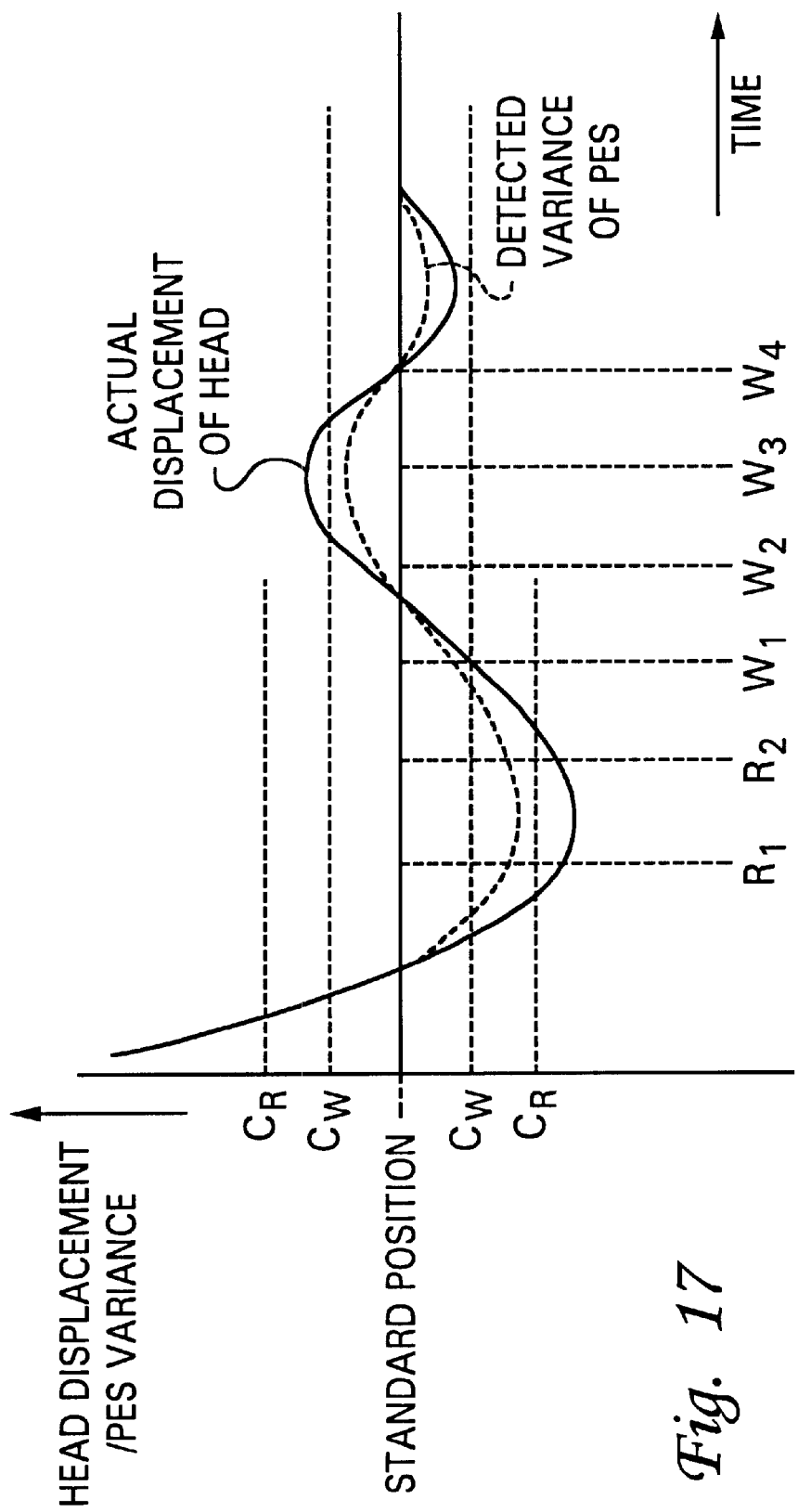
FIG. 17 is a diagram illustrating the actual displacement of the read head element and detected PES during seek operation.

Accordingly, the PES calculated from the above equation (1) is smaller than the actual displacement of the read head element 22 in the ranges of the displacement of the read head element 22 from 64 to 96 and from 160 and 192. Therefore, in these ranges from 64 to 96 and from 160 to 192, as shown in FIG. 17, the detected PES shown by a dotted line is smaller than the actual displacement of the read head element 22 shown by a solid line.

In a conventional disk drive, for instance, seek completion is determined by the following method. In advance, a range Cr of the PES around a standard position and a range Cvr of the variance rate of the PES which enable the head to read data are predetermined. A range Cw of the PES around a standard position and a range Cvw of the variance rate of the PES which enable the head to write data are also predetermined.

During seek operations, the HDC 10 and other components monitor the PES from the W/R channel 8. After the PES is within the Cr range a predetermined number of times (e.g., two times) and the variance rate of the PES is within the Cvr range, if the PES is within the Cw range another predetermined number of times (e.g., three times) and the variance rate of the PES is within the Cvw range, then a seek complete command is generated. When the seek complete command is generated, the HDC and other components change their operation mode from seek operation to track following operation.

The conventional method of detecting seek completion has the following problem. When a detected PES happens to be smaller than an actual displacement of the read head element 22 as described above and as shown in FIG. 17 at time W3 for example, a seek complete command is generated although the actual head position is not within the Cw range because the detected PES is within the Cw range. If write operations are performed in this situation, the write position accuracy is inadequate. This in turn would cause the data error rate to increase.

In order to solve this problem, after the third comparison, while the PES is compared with the Cw range and the variance rate of PES is compared with the Cvw range, respectively, the hard disk apparatus according to an embodiment of the present invention calculates forecasts of the PES for the next servo sector readouts and determines whether the forecast is in a predetermined range (Cw' which is smaller than Cw). If the forecast is in the range Cw', the HDC 10 issues a seek complete command. Otherwise, the procedures for determining whether the PES is within the Cw range and whether the variance rate of the PES is within the Cvw range are repeated.

Figure 18:
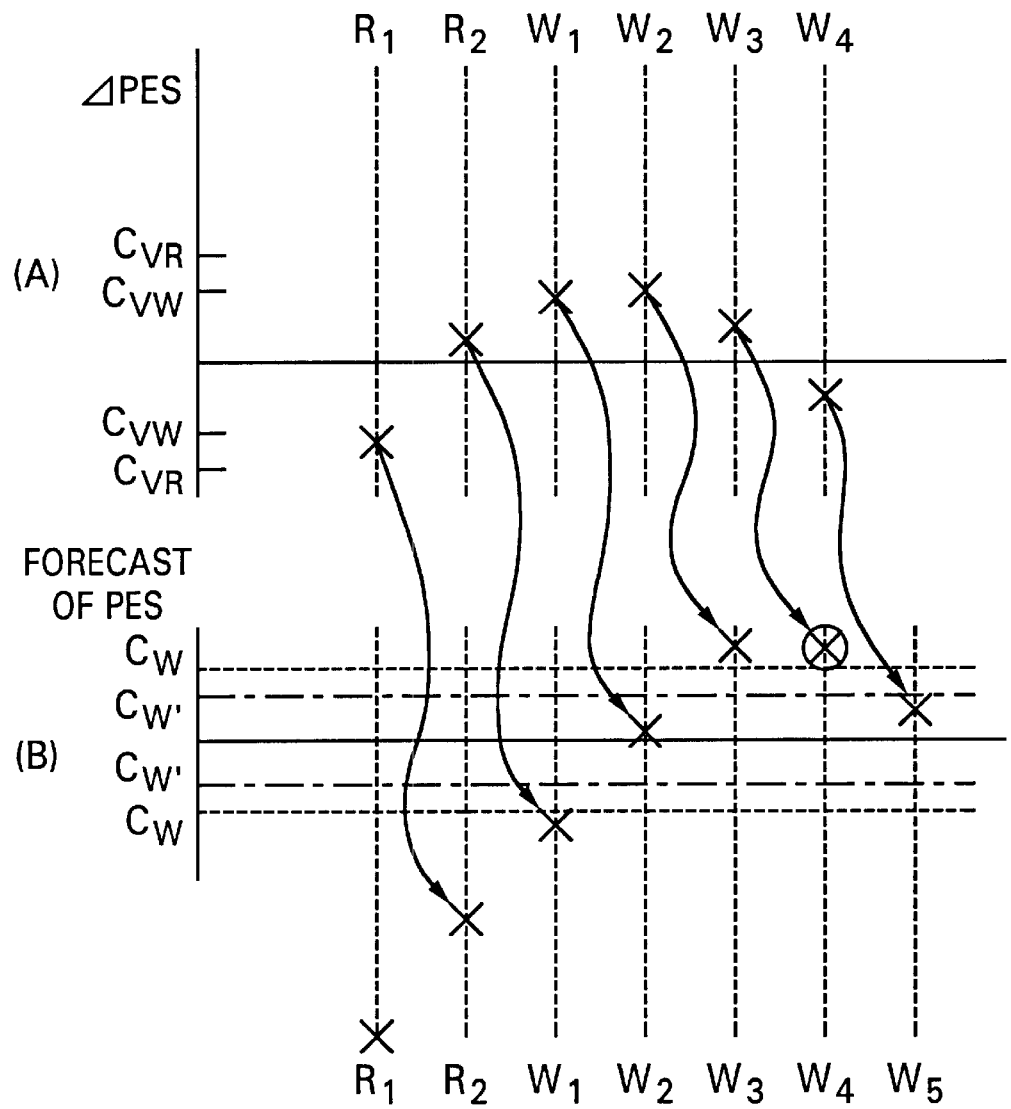
FIG. 18 is a diagram illustrating the variance rate of PES and forecast of PES.

FIG. 18(A) and 18(B) show forecasts of the PES calculated from the PES shown in FIG. 17 and a variance rate ($\Delta$PES) of PES at each corresponding time. If a forecast of the PES at the next time W4 is calculated from the variance rate ($\Delta$PES) of the PES at time W3 shown in FIG. 18(A), the forecast is not in the Cw' range as shown in FIG. 18(B). Accordingly, the HDC 10 does not issue a seek complete command at time W3 but instead determines whether the PES is within the Cw range and whether the variance rate ($\Delta$PES) of PES is within the Cvw range at time W4. At time W4, since the PES is within the Cw range, the variance rate ($\Delta$PES) of PES is within the Cvw range, and the forecast of PES at time W5 is within the Cw range, the HDC issues a seek complete command at time W4.

In the above case, the seek complete command is issued a sector servo space (detection period of PES) later than in the conventional method of determining seek completion. However, the present invention improves the accuracy of the recording position in comparison with the conventional method because the PES tends to be more stabile as seek completion is approached. The present invention can thereby increase the reliability of data recording by using this method of determining seek completion since it effectively prevents the head from recording data when the actual position of the read head element 22 is not within the Cw range, even if the detected PES is smaller than the actual displacement of the read head element 22. The present invention thus avoids the increased error rate in conventional systems that occurs when the PES is smaller than the actual displacement.

Figure 19:
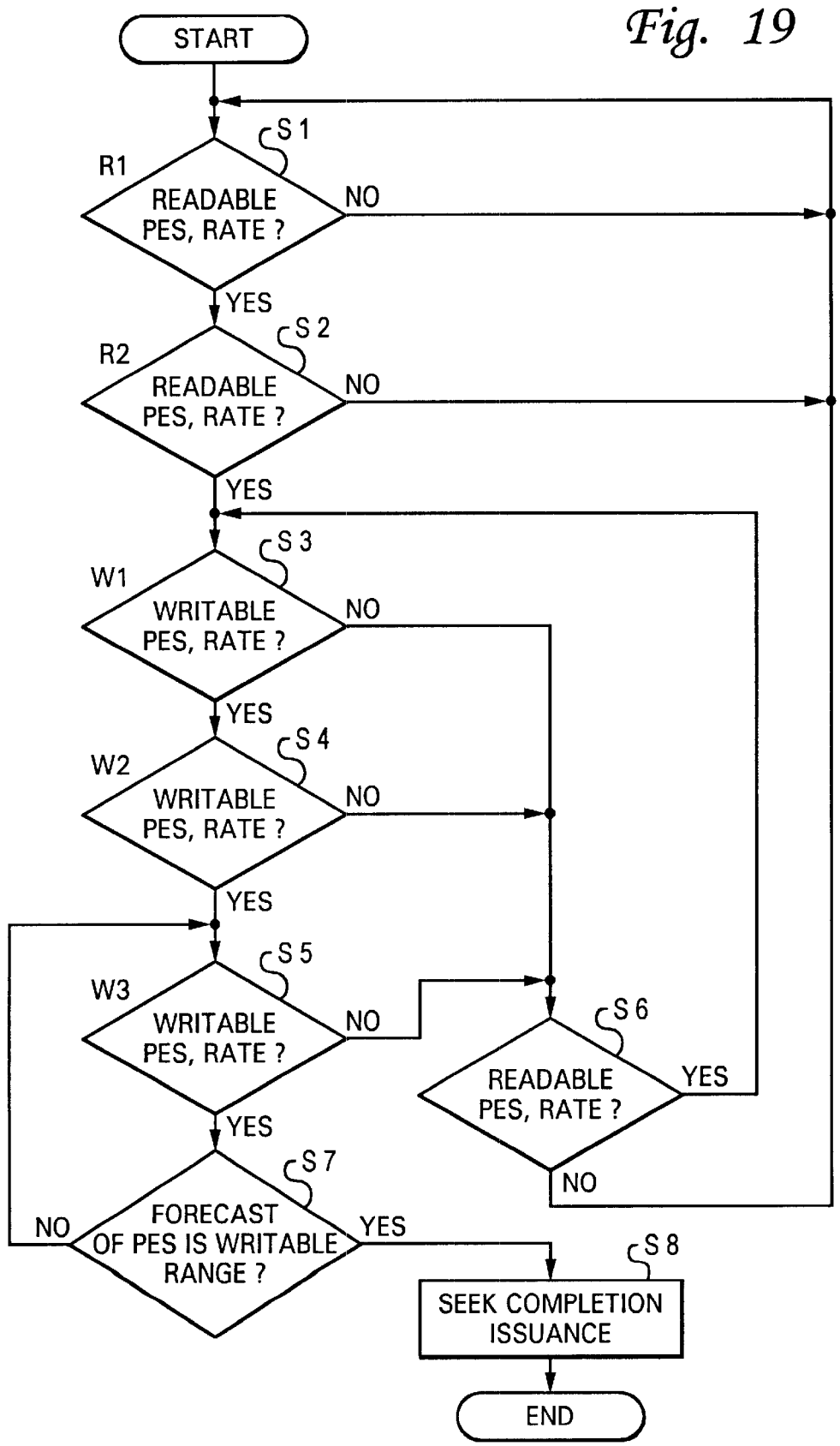
FIG. 19 shows a flow chart illustrating a procedure for determining seek completion according to one embodiment of the present invention.

FIG. 19 shows a flow chart that illustrates a procedure for determining seek completion according to one embodiment of the present invention. During seek operations, the HDC 10 detects the current position of the head 2 based on the head position signal (POS) or the PES. At step S1 in FIG. 19, the HDC determines whether the PES is within the above Cr range and whether the variance rate ($\Delta$PES) of PES is within the Cvr range. If these conditions are all satisfied, then the procedure continues at step S2. Otherwise, the HDC 10 waits at step S1 until all these conditions are satisfied.

At step S2, the HDC determines whether the same conditions are met. If these conditions are all satisfied, then the procedure continues at step S3. Otherwise, the procedure returns to step S1.

At step S3, the HDC determines whether the PES is within the above Cw range and whether the variance rate ($\Delta$PES) of PES is within the Cvw range. If these conditions are all true, then the procedure continues at step S4. Otherwise, the procedure goes to step S6.

At steps S4 and S5, HDC 10 determines whether the same conditions as in step S3 are met. If all the conditions are met, then the procedure goes to steps S5 or S7, respectively. Otherwise, the procedure continues at step S6.

At step S6, HDC 10 determines whether the same conditions as in step S1 are met. If all the conditions are met, then the procedure goes back to step S3. Otherwise, the procedure returns to step S1.

At step S7, HDC 10 calculates a forecast of the PES and determines whether the forecast is within the above Cw' range (this Cw' range is calculated by multiplying Cw by a predetermined value, for example, 0.75). If this condition is met, then the procedure continues at step S8, issues a seek complete command, and completes the seek operation. The operation mode is then changed to track following control. Otherwise, the procedure goes back to step S8.

In accordance with the above process, after the third step, HDC 10 can determine whether a seek operation is complete by calculating a forecast of the PES for the next servo sector readout while comparing the PES with the Cw range and the variance rate of the PES with the Cvw range, respectively.

While the preferred embodiments of the present invention have been described, it will be appreciated that the invention is not limited to the disclosed embodiments. For example, instead of providing step S7 which calculates a forecast of the PES for the next servo sector readout and determines whether the forecast is within the Cw' range, the determination at step S5 may be done with a more rigorous (smaller) Cw range to compare with the PES and a more rigorous (smaller) Cvw range to compare with the variance rate of the PES. If all the above conditions are true, then the procedure may go directly to step S8. Otherwise, the procedure may go back to step S6.

For example, if the Cw range at time W3 in FIG. 17 is defined to be a value calculated by multiplying Cw by 0.75, then the PES is not within the Cw range at time W3. Therefore, in FIG. 19, the procedure goes from step S5 to step S6 and then to step S3. The comparison between the PES and the Cw range and the comparison between the variance rate of PES and the Cvw range are then repeated. This procedure thereby reduces the variance of the PES and improves the accuracy of the positioning of the write head element 23.

Furthermore, in this example, if the conditions in step S5 are not satisfied, the procedure may (abort) stop a write command without going to step S6. As a result, although the HDC 10 executes the aborted write command again, the time required for head 2 to get to a target track is very short since the head has already been positioned near the target track by the latest seek operation. This enables higher speed rewrite operations compared to seek operations which require head movement.

Alternatively, operation may be switched based on the zone to which a target track belongs or on the location at which a target track is positioned. If the offset between the read head element 22 and the write head element 23 is small, the track recording position is adjacent to the center of the track, or the position of the read head element 22 during read operations is chosen to be adjacent to the center of a track, and the accuracy of the PES is high. Therefore, the conventional method of detecting seek completion may be used. Furthermore, at zones or tracks where the accuracy of the PES during read operations is good, the conventional method of detecting seek completion may be used, thereby reserving the procedure of the present invention shown in FIG. 19 to detect seek completion for the other zones or tracks which have a lower accuracy PES.

Any other modification, variation or equivalent arrangement within the scope of the accompanying claims should be considered to be within the scope of the invention.

According to the invention, since the control of the servo control module is compensated so that, during write operations, the position of a write head element is a predetermined position widthwise on a track corresponding to an offset between a read head element and the write head element, the accuracy of the recording position on a track is improved and thereby allows the track pitch to be narrower.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A disk drive apparatus, comprising:
    a disk-shaped recording medium provided with a plurality of concentric tracks on which a servo pattern is recorded for the purpose of tracking control;
    a head actuator module having a read head element and a write head element, said head actuator module moves said read head element and said write head element in a transverse direction across the tracks, said head actuator module separately positions said read head element and said write head element in the radial direction of the tracks, with an offset which varies with a skew angle of the head actuator module;
    a position detection module which detects a position of the read head element from a readout signal of the servo pattern read by the read head element, and outputs a position detection signal;
    a servo control module which controls the head actuator module based upon said position detection signal;
    an offset detection module which detects the offset between the read and write head elements in the radial direction of the track according to the skew angle, and outputs an offset detection signal;
    a write head element position compensation module which based on the offset detection signal, controls the servo control module so as to position the write head element at a predetermined position along the radial direction of a first predetermined track during write operations; and
    a read head element position compensation module which compensates the control of the servo control module so that, during read operations, the read head element is positioned at a predetermined location in a second predetermined track depending upon the detected output from the offset detection module and wherein the read head element position compensation module is adapted for controlling the read head element so that the read head element is positioned during read operations between the positions of the write head element and the read head element during write operations.

2. The disk drive apparatus of claim 1, wherein the write head element position compensation module is adapted for compensating the servo control module so that the write head element is positioned at the center of the first predetermined track.

3. The disk drive apparatus of claim 1, wherein the write head element position compensation module is adapted for controlling the servo control module so that the read head element is positioned so that the accuracy of the position of the read head element detected by the position detection module is not deteriorated.

4. The disk drive apparatus of claim 1, wherein the offset detection module has a table to store the offsets corresponding to the skew angles, and said offset detection module detects and outputs the offset by referring to said table.

5. The disk drive apparatus of claim 1, wherein the read head element position compensation module is adapted for controlling the servo control module so that the read head element is positioned at the center of the second predetermined track.

6. A method of controlling seek operations of a head actuator module having read head element and a write head element in a magnetic recording device comprising the steps of:
    positioning separately said read head element and said write head element in the radial direction of a track, with an offset which varies with a skew angle of the head actuator module;
    detecting a position of said read head element from a readout signal of the servo pattern read by the read head element;
    outputting a position detection signal;
    controlling the head actuator module based upon said position detection signal;
    detecting the offset between the read and write head elements in the radial direction of the track according to the skew angle;
    outputting an offset detection signal;
    positioning the write head element, based on the offset detection signal, at a predetermined position along the radial direction of a first predetermined track during write operations;
    compensating the control of a servo control module such that, during read operations, the read head element is positioned at a predetermined location in a second predetermined track depending upon the offset detection signal; and
    positioning the read head element during read operations between the positions of the write head element and the read head element during write operations.

7. The method as recited in claim 6, wherein said positioning the write head element includes compensating a servo control module that controls the head actuator module so that the write head element is positioned at the center of the first predetermined track.

8. The method as recited in claim 6, wherein said positioning the write head element includes controlling a servo control module that controls the head actuator module whereby the read head element is positioned such that the accuracy of the position of the read head element detected by the position detection module is not deteriorated.

9. The method as recited in claim 6, wherein said detecting the offset between the read and write head elements includes utilizing a table to store the offsets corresponding to the skew angles.

10. The method as recited in claim 6, wherein the read head element is positioned at the center of the second predetermined track.

* * * * *